June 17, 1969     R. F. LEONHARDT     3,450,425

SEAT ADJUSTER LATCH CONSTRUCTION

Filed Nov. 14, 1967

INVENTOR:
ROBERT F. LEONHARDT

ATTY.

United States Patent Office 3,450,425
Patented June 17, 1969

3,450,425
SEAT ADJUSTER LATCH CONSTRUCTION
Robert F. Leonhardt, Roscoe, Ill., assignor to Atwood Vacuum Machine Company, Rockford, Ill., a corporation of Illinois
Filed Nov. 14, 1967, Ser. No. 682,810
Int. Cl. F16b 7/14
U.S. Cl. 287—58                                    4 Claims

ABSTRACT OF THE DISCLOSURE

The latching means in this seat adjuster, designed to withstand severe overloading, as in a crash or collision, involves a latch pivoted on the seat supporting slide on a horizontal axis and having a channel-shaped rearwardly extending end portion in the lower horizontal wall, of which a window opening is provided to receive a tooth of the rack provided on the fixed slide, the wall when the opening receives a tooth fitting snugly against the adjacent sides of the neighboring two teeth to distribute the shear load over three teeth instead of one. In addition, this wall, besides being in trailing relation to the pivot and being normally spring pressed toward locked position, is below the horizontal plane through the horizontal axis of the latch, so the latch is less apt to become disengaged under overloading, as in a crash. Furthermore, the other wall of the channel section which is on the top of the latch extends forwardly beyond the pivotal axis for reinforcement of the latch to prevent distortion under overload, both ends of this other wall being directed downwardly for added strength and rigidity, the front end portion providing a positive stop to limit release movement by engagement with the top of the seat supporting slide.

---

This invention relates to seat slide structures for use with adjustable seats for vehicles, such as automobiles and trucks, and has for its principal object the provision of improved latch means for locking the seat securely in its adjusted positions, having particular regard for the importance of the latch holding securely under severe overload, as in the event of a crash, realizing that in such event, with the driver and one or more passengers secured to the seat with seat belts, the seat latch is subjected to enormous over-loading in such an emergency and ordinary conventional designs of latches are not safe and cannot be relied upon. To meet these requirements, the present latch, in accordance with my invention, has a window type opening provided in one side wall of the generally channel-shaped end portion of the pivoted bellcrank type latch lever to receive a tooth of the rack provided on the top of the fixed seat slide member while portions of the wall on opposite sides of the opening engage snugly in the spaces to the front and rear of the tooth received in the window opening, whereby to distribute the shear load over three teeth of the rack, the channel-shaped portion mentioned being provided in trailing relationship to the pivot for the latch lever in a horizontal plane below the horizontal plane through the pivotal axis, so as to cause tighter engagement of the latch and insure against its disengagement under crash load, the opposite wall of the channel referred to being given a special curved formation with downwardly curved front and rear end portions to resist deformation of the rack engaging end portion of the latch under crash loading.

The invention is illustrated in the accompanying drawing, in which

Similar reference numerals are applied to corresponding parts throughout the views.

Figure 1:
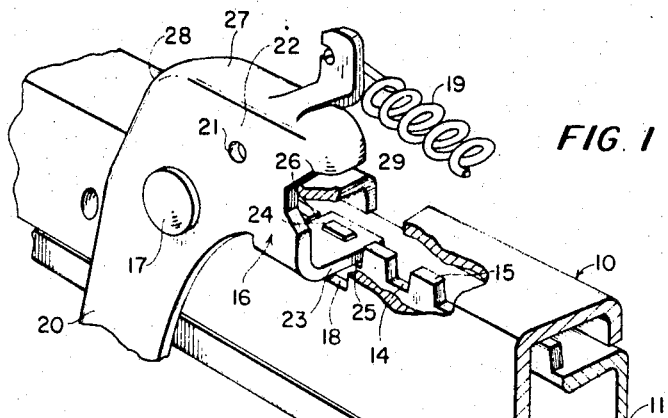
FIG. 1 is a perspective view of a seat slide structure showing the improved latch construction of my invention a portion being broken away to better illustrate the invention.
Figure 2:
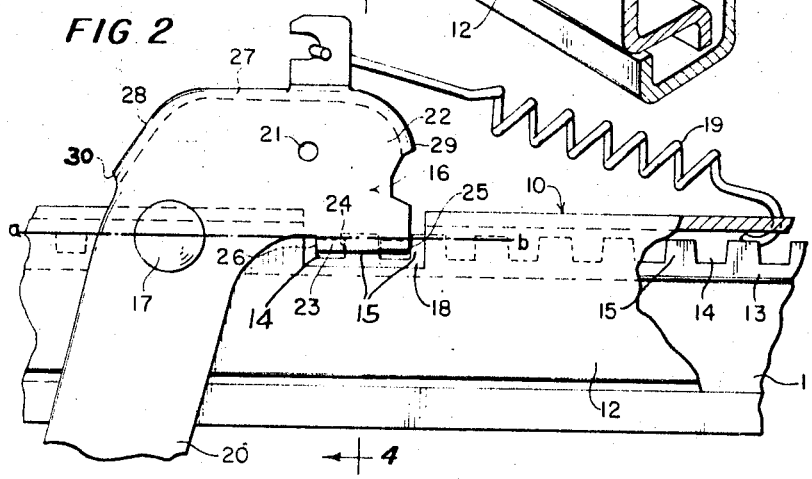
FIG. 2 is a side view of FIG. 1.
Figure 4:
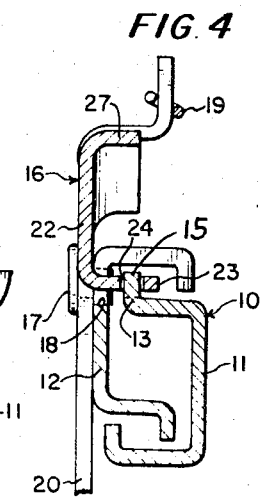
FIG. 4 is a cross-section on the line 4—4 of FIG. 2.
Figure 3:
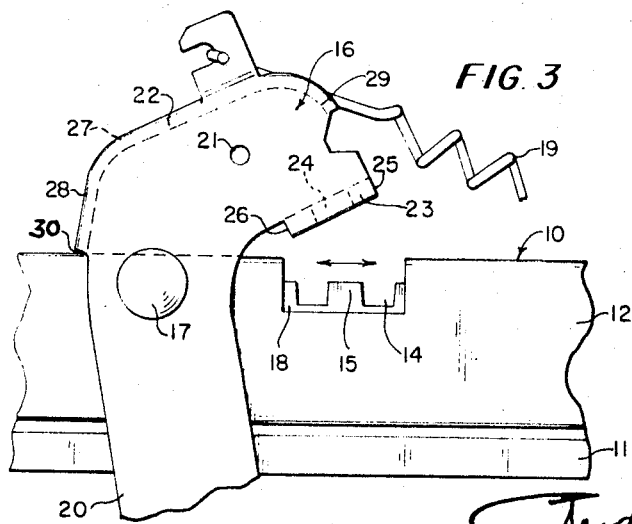
FIG. 3 is another side view showing the latch lever in disengaged position for seat adjustment.

Referring first to FIGS. 1 to 4, a seat slide structure embodying the improvements of my invention is indicated generally by the reference numeral 10, two of these structures being provided in connection with each seat, attached to the bottom of the seat at the opposite ends by means of bolts or in any other suitable manner, and suitably secured to and supported on the floor on suitable brackets to which the seat slide structures are secured by means of other bolts or in any other suitable manner. Each seat slide structure 10 comprises a fixed generally channel-shaped member 11 and a telescoping generally channel-shaped member 12 that is movable with and supports the seat, suitable balls and/or rollers or other means (not shown) providing anti-friction bearing support for the channel 12 on channel 11 in a manner well known in this art. An upwardly projecting flange 13 on top of the fixed channel 11 is notched at uniformly spaced intervals, as at 14, to define uniformly spaced rack teeth 15 all of one size to cooperate with a latch indicated generally by the reference numeral 16 for locking the seat in any selected position of adjustment, the latch being pivoted at 17 on a horizontal axis relative to the seat supporting channel 12 to engage a portion of the rack 15 that is exposed in a cutout portion 18 provided in the upper portion of the movable channel 12. Both seat slide structures of a pair for a seat have similar latches 16 cooperating with similar racks 15 in the same manner and each has a coiled tension spring 19, normally holding the latch in locked position, but the latch 16 on the left hand assembly, the one shown, has a hand lever extension 20 by means of which the latch can be released manually by oscillating the same against the action of the spring 19 as shown in FIG. 3. The small hole 21 provided in the latch receives one end of a wire (not shown) extending crosswise between the two latches and passed through a similar hole in the other latch for connecting the two latches to work together to be released or engaged simultaneously, the two protruding end portions of the wire being suitably bent for connection to the two latches. Each of the latches 16 has a generally rectangular end portion 22 that is of channel-shaped cross-section at one end where the lower flange 23 forming one side wall of the channel has a window opening 24 provided therein of a size to have close engagement over one tooth 15 of the rack, while the opposite ends 25 and 26 of the flange 23 have abutment with the adjacent sides of the neighboring two teeth 15 of the rack, whereby to distribute the shear load between three teeth of the rack, instead of only one tooth having to assume this loading. In the event of a crash, especially if the seat is occupied by more than just the driver of the car or truck, especially where seat belts are used that are fastened to the seat and therefore add considerable additional weight and momentum to be taken into consideration in such an emergency, this good distribution of the shear load could easily make the difference between severe injury or even death of one or more persons involved as against only a jolt, depending of course upon the nature of the collision and the speed involved. In this connection, it is important to note that the wall 23 is disposed in a horizontal plane below the horizontal line a-b passing through the axis of pivot 17, and, consequently, in the event of a collision, since the wall 23 is in trailing relation to the pivot 17, the reaction on the latch 16 is in a clockwise or downward direction with respect to pivot 17, so the latches 16 on the two seat slide structures, which it must be remembered are both held down under tension of springs 19, are further insured against being accidentally released.

The opposite side wall 27 of the channel-shaped end portion 22 of each latch 16 extending the full length of the end portion to give adequate reinforcement against likelihood of deformation of this portion of the latch under crash loading, considerable additional reinforcement being obtained by curving the front and rear ends 28 and 29 of this outer or upper wall downwardly, as best seen in FIGS. 2 and 3, the end portion 28 extending as close as possible to the pivot 17 to reduce likelihood of distortion under crash load to a minimum while at the same time defining a stop at 30 at the end of the front end portion 28 positively to limit the oscillatory movement of the latches in the releasing direction, as seen in FIG. 3. This also eliminates likelihood of overstretching the return springs 19.

In operation, sufficient lubricant is applied to each seat slide structure at the time of assembly to last the life thereof and insure quiet and easy operation at all times. There are stops (not shown) positively limiting the forward and rearward travel of the channel members 12. The latches 16, by virtue of the novel construction of the wall portions 23 in relation to the rack 15 provide not only a far more reliable locking engagement of the latches for greatly reduced wear and tear on the interfitting parts, but less likelihood of any eventual looseness and consequent rattle, and, as described above, the latches by virtue of the plane of the wall 23 being below the pivotal axis 17 and the wall 23 being in trailing relation to the pivot are far less apt to become disengaged in a crash. They are furthermore made much stronger, and less apt to become distorted, by virtue of the reinforcing channel formation of the end portions 22 and the curvature downwardly at 28 and 29 at both ends of the outer wall 27, thereby meeting the need for heavy duty latching means now that seat belts have come into such general use and the loads imposed on seat latching means are thereby greatly increased.

Figure 5:
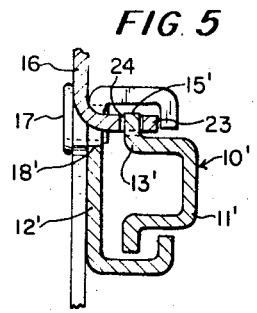
FIG. 5 is a similar section, but showing a different seat slide construction.

In conclusion, FIG. 5 illustrates another seat slide construction 10′ wherein the fixed channel member 11′ has both of its flanges inside the movable channel member 12′, the upper flange 13′ having the rack 15′ provided thereon to cooperate with the latch 16 in a similar manner as in the other construction first described, channel 12′ being cut away at 18′ to provide operating clearance for the portion 23 of the latch in which window opening 24 is provided. Balls and/or rollers (not shown) provide anti-friction rolling support for channel 12′ on channel 11′ in a manner well understood in this art. The operation of this construction is substantially the same as the other.

It is believed the foregoing description conveys a good understanding of the objects and advantages of my invention. The appended claims have been drawn to cover all legitimate modifications and adaptations.

I claim:

1. In a seat slide structure comprising an elongated stationary horizontal slide member, an elongated horizontal seat supporting slide member slidably supported on the first mentioned slide member in telescoping relation thereto, and a latch member pivoted on a substantially horizontal axis on said seat supporting slide member having a substantially horizontal wall extending therefrom in which an opening is provided, the walls defining selectively engage over substantially vertically extending rack teeth provided in uniformly spaced relation on the first-mentioned slide member, the improvement which consists in the provision of said opening of a size and shape for the walls thereof to fit closely on the selected tooth and the provision of said horizontal wall of a length on opposite sides of the tooth-receiving opening having the end faces thereof to engage opposed flanks of two neighboring teeth on opposite sides of the tooth received in the opening, whereby to distribute the load on three teeth in each engagement and thereby insure better holding action in event of any unusual strain tending to cause relative longitudinal movement between said slide members, the wall referred to being disposed in a substantially horizontal plane below a horizontal plane through the pivotal axis of said latch.

2. A slide structure as set forth in claim 1 wherein the latch member is of stamped sheet metal construction and of channel section through that portion including as one side of the channel said horizontal wall with the tooth receiving opening provided therein, the other side wall of the channel section spaced vertically relative to said first mentioned horizontal wall having a reinforcing end portion extending in transverse relation to said channel for increased strength and rigidity of the latch and to resist deformation of said latch in the event of any excessive loading thereof in a generally horizontal direction.

3. A slide structure as set forth in claim 1 wherein the latch member is of stamped sheet metal construction and of channel section through that portion including as one side of the channel said horizontal wall with the tooth receiving opening provided therein, the other side wall of the channel section spaced vertically relative to said first menitoned wall having a reinforcing end portion extending in transverse relation to said channel for increased strength and rigidity of the latch and to resist deformation of said latch in the event of any excessive loading thereof in a generally horizontal direction, the other side wall of said channel opposite the wall with the tooth receiving opening provided therein extending substantially horizontally away from said first mentioned wall to vertically spaced relation to and above the pivot of said latch, where there is another end portion extending downwardly in transverse relation to said channel and in the general direction of said pivot for further reinforcement and rigidity of said latch member to better withstand deformation under load in a generally horizontal direction.

4. A slide structure as set forth in claim 1 wherein the latch member is of stamped sheet metal construction and of channel section through that portion including as one side of the channel said horizontal wall with the tooth receiving opening provided therein, the other side wall of the channel section spaced vertically relative to said first mentioned wall having a reinforcing end portion extending in transverse relation to said channel for increased strength and rigidity of the latch and to resist deformation of said latch in the event of any excessive loading thereof in a generally horizontal direction, the other side wall of said channel opposite the wall with the tooth receiving opening provided therein extending substantially horizontally away from said first mentioned wall to vertically spaced relation to and above the pivot of said latch, where there is another end portion extending downwardly in transverse relation to said channel and in the general direction of said pivot for further reinforcement and rigidity of said latch member to better withstand deformation under load in a generally horizontal direction, the last mentioned transversely extending portion of said other wall of said channel defining a stop which by engagement with the seat supporting slide positively limits pivotal movement of said latch member in a releasing direction.

(References on following page)

References Cited

UNITED STATES PATENTS

| | | | |
|---|---|---|---|
| 2,827,106 | 3/1958 | Cramer et al. | 248—430 |
| 3,279,737 | 10/1966 | Krause | 248—430 |
| 3,394,912 | 7/1968 | Bullen | 248—430 |

CARL W. TOMLIN, *Primary Examiner.*

ANDREW V. KUNDRAT, *Assistant Examiner.*

U.S. Cl. X.R.

74—533; 248—430; 287—189.36; 297—346